Aug. 24, 1926.
Re. 16,407
H. H. FREY
LEVEL INDICATING APPARATUS
Original Filed May 10, 1918
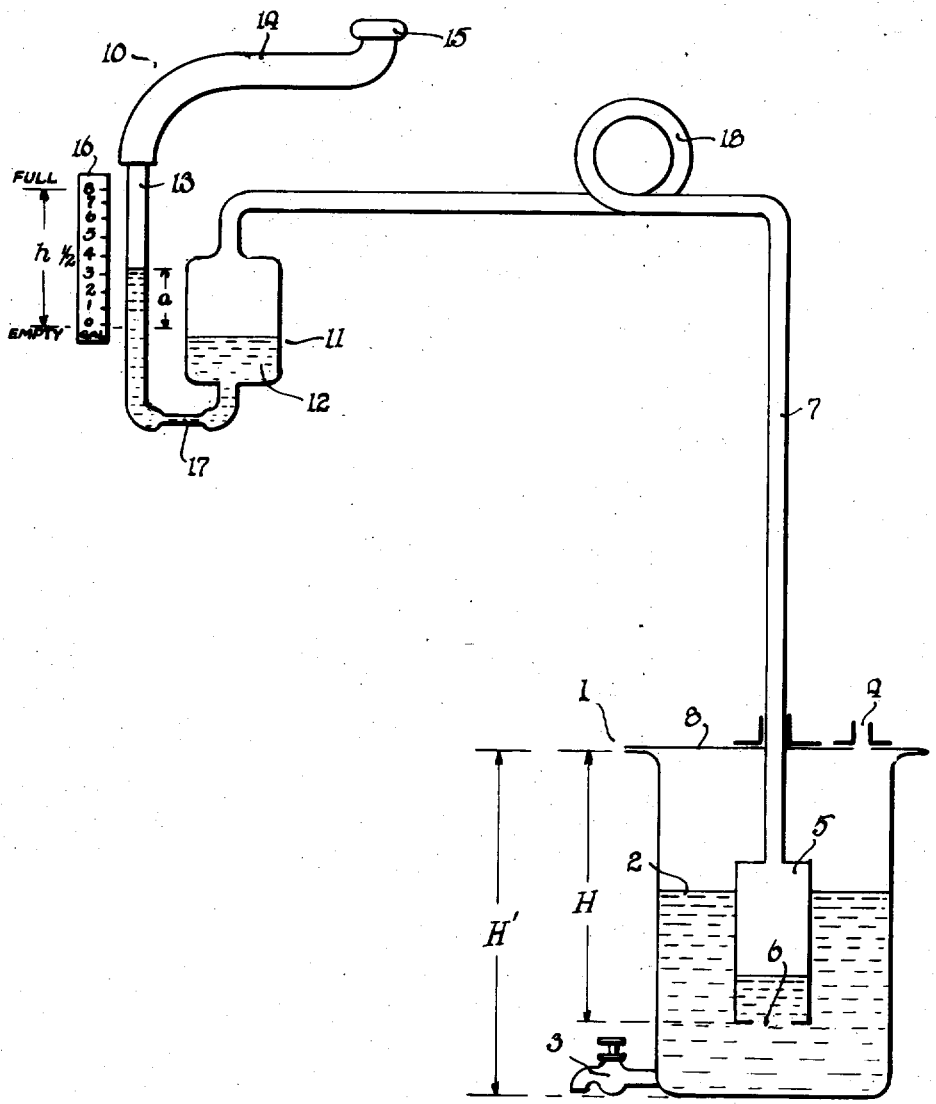
Inventor
Herbert H. Frey
by Hannah H. Frey, Administratrix
By Brown, Boettcher & Penner
Att'ys Reissued Aug. 24, 1926. Re. 16,407

UNITED STATES PATENT OFFICE.

HERBERT H. FREY, DECEASED, LATE OF CHICAGO, ILLINOIS; BY HANNAH H. FREY, ADMINISTRATRIX, OF CHICAGO, ILLINOIS, ASSIGNOR, BY MESNE ASSIGNMENTS, TO STROMBERG MOTOR DEVICES COMPANY, OF CHICAGO, ILLINOIS, A CORPORATION OF ILLINOIS.

LEVEL-INDICATING APPARATUS.

Original application filed May 10, 1918, Serial No. 233,743. Renewed September 2, 1921, Serial No. 498,085. Original No. 1,399,205, dated December 6, 1921. Application for reissue filed December 5, 1923. Serial No. 678,779.

My invention relates to level indicating apparatus.

It is often desirable to give an indication of the level of liquid in a tank, at a considerable distance from the tank.

Heretofore mechanical indicating means, including floats, have generally been employed. I find that such devices are unsatisfactory, particularly where the vessel in which said float apparatus is contained is subjected to motion or vibration. There is furthermore a practical limit to which said indications can be transmitted mechanically. My present invention aims to provide an improved indicating device for giving an indication of the height of the liquid in a vessel, closed or open, located at any desired distance from the indicating element and positioned at any desired level with respect to the indicating element, all without the use of mechanical connecting or indicating means.

Specifically the apparatus which I provide operates upon well known pneumatic principles and particularly is based upon the experiments of Pascal and Torricelli.

I provide a vessel having an open bottom like a diving bell, which vessel is adapted to be partially submerged in the liquid in the tank, depending upon the level of the liquid in the tank. This vessel or bell traps air or gas between its closed top and the surface of the liquid. The air or gas is thus placed under a pressure equal to the pressure of a column of liquid of the height to which the vessel is submerged. The air or gas is subjected to the submergence pressure existing at the mouth of the vessel.

I provide a special form of manometer of my own invention to form the indicating element for indicating the submergence pressure within the vessel or bell. This manometer is connected to the vessel or bell through a tube of small bore so that the submergence pressure is transmitted to the manometer to give an indication of the submergence pressure, and consequently of the level in the tank. The height of the liquid column in the manometer balances the height of the liquid above the level in the vessel or bell.

The manometer is constructed of a U-tube in which the one leg of the U is formed in the shape of an enlargement or chamber. This leg I term the "storage leg." The other, or "indicating leg" comprises a tube of small bore. The storage leg is of a relatively great capacity compared to the indicating leg, so that only small variations in level will be occasioned by full scale variations in the indicating leg. This relation of sizes of the indicating leg and the storage leg is of importance in recharging the pressure system to be mentioned later.

I have found that due to various causes such as absorption of the air or other gas in the vessel or bell, leakage of the air or gas out of the pressure system and the like, there is a tendency for the air or gas in the pressure system to become reduced, giving an erroneous indication.

This reduction in the amount of air or other gas in the pressure system may be corrected in a number of ways without deranging the manometer or other parts. It is inadvisable to inject the air or other gas for recharging the pressure system directly into the pressure conduit for a number of reasons. One reason is the necessity for introducing valves or other connections which are apt to leak. Another reason is the danger of blowing the indicating liquid out of the manometer without a suitable three way or check valve arrangement.

I provide means for introducing the gas into the pressure system through one of the liquids or by raising the vessel or bell out of the liquid in the tank to permit the vessel or bell to be recharged from the atmosphere.

I have found that where the indicator is located at some distance from the tank the best form of apparatus for effecting the recharging of the pressure system is a pipe connected to the open end of the indicating leg of the manometer, which pipe is connected with a suitable source of air or other gas under pressure. To recharge the system the air or other gas is forced through the indicating leg of the manometer, driving the indicating liquid into the storage chamber in the storage leg and then bubbling up through the indicating liquid and passing into the pressure system. The indicating liquid in the manometer thus serves the function of a valve for admitting and trapping the air or other gas into the pressure system. Any excess of air or other gas is blown out of the bottom of the vessel or bell. The relation of sizes between the indicating leg and the storage leg of the manometer occasions only very slight changes in level in the storage leg when the liquid from the indicating leg is forced into the storage leg for recharging the pressure system, which therefore entails the production of negligible negative pressure.

Instead of introducing the air or other gas through the indicating liquid, I have found that it is equally feasible to introduce the same through the liquid in the tank by placing a pipe in the liquid of the tank with the open end of the pipe located below the opening in the vessel or bell, so that upon blowing air or other gas through this pipe it will permit the air or other gas to pass up through the liquid and through the opening in the bottom of the vessel or bell to recharge the pressure system. When the pressure of air or other gas is cut off from such pipe the liquid in the tank flows into the open end of the pipe and thus forms a trap or valve effectively preventing the escape of pressure from the pressure system. The employment of the liquid as a trap for sealing the pressure system is the same in either case.

Where my device is employed for measuring the variations in liquid in the nature of gasoline or such oils, I find it advisable to employ an indicating liquid of less density than mercury, but of substantially greater density than water, alcohol or the like. I have found that in most commercial installations it is advisable to have the indicator of relatively smaller size than the tank, and inasmuch as the tank for holding gasolene and the like on automobiles and other commercial vehicles is limited to about 12 to 15 inches, and whereas the indicator must be limited to substantially 6 inches for suitable location on the dashboard of the vehicle, I provide a liquid of a specific gravity in the neighborhood of 2 to 4.

This permits of a satisfactory and workable arrangement for giving the maximum indication within the limits imposed by fixed conditions.

Another valuable feature which I have provided is the employment of a small bore tube connecting the indicating leg with the storage leg so that inequalities in the level of the liquid in the tank caused by motion of the vehicle or the like, will not make themselves immediately apparent on the indicating leg.

This reduction in the size of the tube connecting the two legs has a double function. It serves first as a restriction for the flow of liquid during rise and fall in the indicating tube and to reduce the volume of liquid lying between the indicating leg proper and the storage leg.

As a further improvement I have placed the vessel or bell a fixed distance above the outlet of the tank in order to maintain a reserve sufficient to permit the vehicle to proceed some distance after giving an indication that the tank is empty with respect to normal conditions.

This location of the vessel or bell above the bottom of the tank has a further important function of permitting automatic recharging of the pressure system as will be described in detail later.

I contemplate the use of a liquid seal or check valve for recharging the storage system whether the liquid so employed be used for the indicating liquid or not. For instance I may employ a pressure gage for indicating level and may then employ a liquid sealed inlet for recharging the pressure system. Mercury may be employed for thus sealing the system, a small column only being required.

In order to acquaint those skilled in the art with the manner in which my invention may be constructed and practised, I shall now describe in detail one embodiment of my invention in connection with the accompanying drawings, which form a part of the specification.

The single figure of the drawing indicates diagrammatically one embodiment of my invention. A containing tank 1 for containing a body of liquid such as fuel is provided with an outlet 3, preferably in the form of a valved pipe or the like and an inlet or filling opening 4. The tank may be either closed or open. Within the tank 1 I provide a vessel or bell 5 having an open bottom 6. The vessel or bell 5 is connected to a tube 7 of small diameter which passes out of the tank as for example through the top 8 of the containing tank 1 and leads to the manometer 10 which is located at any desired distance from the containing tank 1. The manometer may be placed at any desired level with respect to the tank.

The manometer 10 comprises a U-shaped vessel preferably made in whole or in part of glass. The one leg of the U indicated at 11 is formed with an enlargement or chamber to form a receiving or storage chamber for the indicating liquid 12. The other leg 13, which I term the indicating leg of the manometer, consists of a tube of small diameter, the cross section of the tube or leg 13 being relatively much smaller than the cross section of the leg 11. This proportioning of the two legs of the manometer serves a double function. First of all, the relative sizes permits the indicating liquid 12 to rise in the indicating leg 13 without appreciably lowering the level of liquid in the storage leg 11 so that the height of the column in the leg 13 above zero may be taken as an indication of the level in the tank. A further purpose of the enlargement in the storage leg is to permit the recharging of the pressure system without expelling the liquid 12 from the manometer, or occasioning any appreciable rise in the liquid in the storage leg. For this latter purpose I have provided a flexible tube 14 which is connected to the upper end of the indicating leg 13 and is provided with a mouth piece 15 so that the user of the apparatus may blow through the tube 14 to recharge the pressure system. Any other means or source of pressure may be employed.

I provide a scale 16 which is so placed with respect to the indicating leg 13 that by comparison of the height of the column of liquid as indicated at *a* in the figure, with the corresponding graduations on the scale 16, the observer is able to ascertain the height of the liquid in the tank 1.

Inasmuch as there is a well defined practical limit of the depth of the ordinary automobile fuel tank, and inasmuch as it is desirable to have the scale 16 of a conveniently small height but at all times large enough to indicate plainly the differences in level, I find it necessary to provide a special liquid for use in this connection. Inasmuch as the entire indicating instrument 10 should not exceed 6 or 7 inches, so as to be conveniently placeable on the dashboard of the vehicle, I provide a liquid of a specific gravity of the order of 2 to 4. Such liquid may be a mixture of mercury iodid and potassium iodid.

When the vehicle is in motion the level of the liquid may vary, due to such motion and due to surging back and forth, so that pulsations of pressure in the pressure system might tend to cause similar pulsations in pressure on top of the liquid in the storage leg 11 and thus cause fluctuations of the column of liquid in the indicating leg 13. To prevent such sharp changes or minor fluctuations in level being immediately transmitted to the indicating column, I provide a restricted channel between the storage leg and the indicating leg in the shape of a small bore tube as shown at 17. The tube 17 permits only of slow variations in level being indicated and tends to damp out any surging or oscillation.

The pressure system comprising the top of the storage leg, the conduit 7 and the vessel or bell 5 may extend to any convenient distance or height within limits, but it should be fluid tight. In case of leakage of the fluid within the pressure system, an erroneous indication on the manometer would be given. Similarly if the fluid within the pressure system were absorbed by the liquid in the tank, or by the indicating liquid in the manometer, an erroneous indication might be given. I have provided means for recharging the pressure system automatically by placing the bottom of the vessel or bell 5 a predetermined distance above the bottom of the tank 1. This serves a double function. The manometer indicates for a full scale division, as indicated by *h* on the scale 16 the height H of liquid above the bottom of the vessel or bell 5 in the tank 1. As the liquid 2 is drawn off through the connection 3, the level will drop below the mouth of the vessel or bell 5, thereby permitting this vessel and the pressure system to become recharged with air at atmospheric pressure. At the same time the indicator will indicate that the tank is at zero level. However, when the indicator gives an indication of zero level in the tank, there is still a reserve supply in the bottom of the tank which will suffice for driving the vehicle a considerable distance. Consequently the pressure system will be automatically recharged just before the tank is filled, so that a correct indication of the degree of filling of the tank will be given.

I have provided further means for permitting the pressure system to be charged by forming the conduit 7 so that the vessel or bell 5 may be drawn above the level of the liquid in the tank 1 to permit the system to become recharged with air at atmospheric pressure. When the bell is again submerged to the proper extent the indicator will give the correct indication of the height of the liquid level in the tank. To permit the vessel or bell 5 to be raised I have shown a coil or flexible portion 18 in the drawing.

The operation of the device is as follows. Normally when the tank 1 is empty or contains liquid the level of which lies below the mouth of the bell or vessel 5 the pressure system contains air at atmospheric pressure. The indicating liquid 12 will stand at the same level in both of the legs 11 and 13. When the tank is further filled with liquid so that the air is trapped in the vessel or bell 5, such air will be subjected to the submergence pressure of the mouth of the vessel or bell and this pressure is transmitted through the conduit 7 to the storage leg of the manometer 10. The pressure exerted upon the top surface of the liquid 12 in the storage leg 11 causes the column of liquid to rise in the indicating leg to such a height as to balance the pressure in the storage leg.

It is to be noted that the tube forming the indicating leg 13 should not be a capillary tube, otherwise there would be a tendency for the capillary action to interfere with the balancing of pressure.

It is further desirable to have the leg 13 of a diameter of a size greater than capillary dimensions in order to give good visibility of the column of liquid.

In case the system has been standing for some time so that some of the air might have leaked out of the pressure system or some of the air might have been absorbed by the liquid 2 in the tank 1, the operator may recharge the system either by draining the tank 3 to a point below the opening in the bell 5 or by raising the bell 5 above the level of the liquid 2 or by blowing air through either the liquid 12 or the liquid 2 into the system. Where the indicator is at some distance from the tank 1 it is more convenient to supply the air or other gas by forcing the same through the manometer, the liquid of which is thereby driven into the storage leg to form a liquid check or seal between the pressure system and the atmosphere Where air is employed in the pressure system the operator may simply blow through the tube 14 and the tube 13, driving air through the liquid into the pressure system, any excess of air being discharged from the mouth of the vessel or bell 5 in the tank 1. As previously indicated a tube may be placed in the liquid 2 with its opening below the opening 6 of the tank 5 and air may be blown through said tube, the same rising into the vessel or bell 5 and thus replenishing the pressure system.

It is not essential that air be employed in the pressure system. Any suitable fluid may be employed under the proper conditions. It is advisable to employ air or some other gas which is relatively neutral to the liquids 2 and 12. If a liquid be employed in the pressure system, suitable pistons or diaphragms would be required between the liquid in the pressure system and the other liquids, and account would have to be taken of the difference in level of the various parts of the pressure system.

The liquid 12 may be of any suitable composition.

I do not intend to be limited to the precise details of construction shown and described.

I claim:—

1. In combination, a tank for liquid, a chamber having an opening at its lower end communicating with the liquid in the tank and providing an air space at its upper end, a manometer comprising a U-tube, one leg of said U-tube being of substantially greater diameter than the other, a pressure conduit for gas connecting the air space of the chamber and the upper part of said enlarged leg of the U-tube, and a liquid forming a trap in the bend of the U-tube, said liquid having a greater specific gravity than the liquid in the tank, said legs being connected through a restricted bore and means for introducing gas into the enlarged leg and into the pressure conduit by creating an excess of gas pressure on the indicating leg and forcing the liquid and air through the restricted bore into the enlarged leg of the U-tube.

2. In combination, a tank for liquid of specific gravity less than unity, a chamber having an opening at its lower end communicating with the liquid of the tank, a conduit communicating with the interior of the chamber, said conduit having a trap in the form of a U-shaped bend therein and liquid of a specific gravity of substantially 2 lying in said trap, said trap having indicating means for indicating in terms of quantity or level in the tank and means through which gas may be forced through said U-shaped bend into the conduit.

3. In combination, a tank for liquid, a chamber having an opening at its lower end communicating with the liquid in the tank, a manometer having a small indicating leg and a large storage leg, the storage leg having connection to said chamber, a pressure indicating liquid of a specific gravity greater than unity in said manometer, the manometer having a restricted bore connecting the two legs which prevents any but relatively slow changes of level of the liquid in the indicating leg due to changes of level of liquid in said chamber and means for causing gas to pass through the restricted portion and up through the liquid in the storage leg.

4. In combination, a tank for liquid, a chamber having an opening communicating with the liquid of the tank, a conduit communicating at one end with the top of the chamber, an indicating manometer connected to the opposite end of the conduit, and means for introducing a suitable gas into the conduit, by causing gas to pass through both legs of the manometer.

5. The improvements herein described, comprising a tank for liquid, a chamber communicating at its lower end with the liquid in the tank, a manometer tube having a large storage leg and a small indicating leg, a liquid seal in the manometer tube, a pressure conduit connecting the chamber and the storage leg of the manometer, means through which gaseous fluid may be forced into the upper end of the indicating leg, thereby forcing the liquid in the indicating leg into the storage leg and breaking the seal, whereby the gaseous fluid rises through the liquid in the storage leg into the pressure conduit.

6. A liquid level indicator adapted to indicate the depth of liquid in a container including a closed chamber partially filled with an indicating liquid, a conduit having one end adapted to extend into the liquid in the container at the full depth to be measured and having the other end opening into said chamber above the indicating liquid therein, a gage tube open at its upper end and in communication at its lower end with said chamber below the level of indicating liquid therein whereby said liquid will rise in said gage in proportion to the depth of liquid in said container, and means whereby atmospheric air is caused to pass through the gage tube, indicating liquid and chamber to replace any absorbed air in the conduit.

7. An apparatus for indicating the depth of liquid in a container comprising a closed chamber partially filled with an indicating liquid, means forming a confined air column between the air space in the chamber and the liquid in the container at the full depth to be measured, a gage tube, means establishing communication between the lower end of the gage tube and the chamber below the level of the indicating liquid therein, means establishing communication between the upper end of the gage tube and a source of air pressure whereby, upon applying said pressure, atmospheric air may be forced through the gage tube, indicating liquid and chamber into the confined air column.

8. In a device of the class described, a tank containing liquid the depth of which is to be indicated, a bell submerged in said liquid and having a terminal opening which is sealed by the liquid, said opening forming one terminal of the system hereinafter defined, a U tube manometer, one leg of which comprises an indicating leg and has a terminal opening leading to atmosphere and forming another terminal of the system, a liquid in said manometer forming a seal to prevent the escape of air from the latter terminal, a tube connecting the other leg of the manometer with the top of the bell to form with said bell and manometer a closed air tight system for confining a body of air between the liquid seals at said terminals, and means at one of said terminals having series connection with the system and through which air may be forced into the terminal opening and through the liquid seal of said one terminal to inject air into the system.

9. In a fuel indicator for automobiles, the combination of a tank for liquid fuel, an indicating device therefor comprising a conduit for air, the lower end of which is enlarged to form an air chamber having its lower end submerged in the liquid fuel at substantially the full depth to be measured, and a pressure actuated indicating device graduated in terms of liquid in the tank connected to the upper end of said conduit, said device comprising a fluid flow restriction for damping out oscillations of the indicator caused by sharp variations of pressure such as occur in the air chamber upon sharp variations in level of liquid in said tank.

10. A liquid level indicator adapted to indicate the depth of liquid in a container, comprising a continuous conduit opened at each end, the upper end opening into the atmosphere and the lower end opening into the liquid at substantially the full depth to be measured, the conduit adjacent its upper end comprising a U-shaped portion, containing an indicating liquid, and forming a manometer, means whereby air is caused to pass through the manometer into the part of the conduit between the indicating liquid and the liquid in the container, to replace any absorbed air in the conduit, said conduit having a flow restriction limiting the rate of entry of air through the manometer, to prevent the liquid from being driven out of the manometer.

11. A liquid level indicator adapted to indicate the depth of liquid in a container, comprising a continuous conduit opened at each end, the upper end opening into the atmosphere and the lower end opening into the liquid at substantially the full depth to be measured the conduit adjacent its upper end comprising a U-shaped portion, containing an indicating liquid, and forming a manometer, means whereby air is caused to pass through the manometer into the part of the conduit between the indicating liquid and the liquid in the container, to replace any absorbed air in the conduit, said conduit having a flow restriction limiting the rate of entry of air through the manometer, said restriction being disposed in a part of the manometer which is normally occupied by liquid and serving also to damp oscillations of the indicating liquid due to sudden variations in level of liquid in the container.

In witness whereof, I hereunto subscribe my name this 3rd day of December, A. D., 1923.

HERBERT H. FREY,
By HANNAH H. FREY,
*Administratrix of the estate of Herbert H. Frey, deceased.*